United States Patent
Cheng et al.

(10) Patent No.: US 10,063,327 B2
(45) Date of Patent: Aug. 28, 2018

(54) SYSTEM AND METHOD FOR ARRAY ANTENNA FAILURE DETECTION AND ANTENNA SELF-CORRECTION

(71) Applicant: NATIONAL CHUNG SHAN INSTITUTE OF SCIENCE AND TECHNOLOGY, Taoyuan (TW)

(72) Inventors: Chu-Hao Cheng, New Taipei (TW); Po-Chun Chang, Kaohsiung (TW); Liang-Ju Huang, Taichung (TW)

(73) Assignee: NATIONAL CHUNG SHAN INSTITUTE OF SCIENCE AND TECHNOLOGY (TW)

(*) Notice: Subject to any disclaimer, the term of this patent is extended or adjusted under 35 U.S.C. 154(b) by 120 days.

(21) Appl. No.: 15/384,470

(22) Filed: Dec. 20, 2016

(65) Prior Publication Data

US 2018/0175946 A1 Jun. 21, 2018

(51) Int. Cl.
*G01R 29/08* (2006.01)
*H04B 17/12* (2015.01)
*H04L 27/36* (2006.01)
*H04L 27/20* (2006.01)

(52) U.S. Cl.
CPC .............. *H04B 17/12* (2015.01); *H04L 27/20* (2013.01); *H04L 27/36* (2013.01)

(58) Field of Classification Search
CPC ................................ G01R 29/08; H04B 17/12
See application file for complete search history.

(56) References Cited

U.S. PATENT DOCUMENTS

| | | | |
|---|---|---|---|
| 2013/0301694 A1* | 11/2013 | Olgaard | H04B 7/0413 375/224 |
| 2016/0197412 A1* | 7/2016 | Fukuda | H01Q 23/00 343/861 |
| 2016/0359573 A1* | 12/2016 | Pauly | H04B 17/12 |

* cited by examiner

*Primary Examiner* — Hoang Nguyen
(74) *Attorney, Agent, or Firm* — Schmeiser, Olsen & Watts, LLP

(57) ABSTRACT

System and method for array antenna failure detection and antenna self-correction are introduced. In the array antenna failure detection and antenna self-correction system, a signal analyzer is employed to perform gain analysis so as to perform gain attenuation/compensation, and a DC offset generator is employed to generate a set of known offset amounts which are added to signals, so that, at the receiving end, a phase offset amount can be derived based on comparisons with the original signal, and antenna correction can then be performed accordingly. In this way, computational complexity of the system can be reduced, and the speed of antenna correction can be increased.

18 Claims, 6 Drawing Sheets

SYSTEM AND METHOD FOR ARRAY ANTENNA FAILURE DETECTION AND ANTENNA SELF-CORRECTION

FIELD OF THE INVENTION

The present invention relates to wireless communication, and in particular to a system and a method for antenna failure detection and antenna self-correction.

BACKGROUND OF THE INVENTION

In the situations of failure of a transmitting/receiving module (T/R module) caused by degradation or other problem, phase modulation correction can be performed by analyzing the association between a reference antenna unit and an array antenna unit in order to have the detection to be performed in advance or reduce the detection cost, wherein the module cannot be sent back to the manufacturer for far-field test on the system. This is a possible solution of correction that is fast, simple, low-cost, and can be readily implemented.

In the conventional techniques for phase modulation correction, channel evaluation information with respect to a plurality of forward links and reverse links is required for computation of phase deviation. Since the channel evaluation information is associated with previous channel information, obtaining the channel evaluation information is relatively complex and cumbersome computation is needed.

SUMMARY OF THE INVENTION

In view of the aforementioned shortcomings of the prior art, the invention provides system and method for array antenna failure detection and antenna self-correction, a signal analyzer is employed to perform gain analysis so as to perform gain attenuation/compensation, and a DC offset generator is employed to generate a set of known offset amounts which are added to signals, so that, at the receiving end, a phase offset amount can be derived based on comparisons with the original signal, and antenna correction can then be performed accordingly. In this way, computational complexity of the system can be reduced; the speed of antenna correction can be increased; and the cost of antenna detection and correction can be also reduced.

Accordingly, the invention provides an array antenna failure detection and antenna self-correction system, comprising: an array antenna, a microprocessor, a signal generator, a direct current (DC) offset generator, a transmitting/receiving circuit, an up/down-conversion circuit, and a signal analyzer. The array antenna comprises at least one antenna unit to be tested and a reference antenna, the reference antenna being electrically coupled to the antenna unit to be tested. The microprocessor is for outputting a control signal. The signal generator, electrically coupled to the microprocessor, is for receiving the control signal and generating a first test transmission signal. The DC offset generator, electrically coupled to the signal generator, is for generating a DC offset signal, so as to perform a DC offset operation on the first test transmission signal and generate a second test transmission signal. The transmitting/receiving circuit, electrically coupled to the microprocessor and the array antenna, is for receiving the control signal and sending the first test transmission signal and the second test transmission signal to the array antenna, and receiving a first test receiving signal and a second test receiving signal from the array antenna. The up/down-conversion circuit, electrically coupled to the microprocessor, the signal generator, the DC offset generator, and the transmitting/receiving circuit, is for receiving the first test transmission signal and the second test transmission signal and sending the first test transmission signal and the second test transmission signal to the transmitting/receiving circuit, and receiving the first test receiving signal and the second test receiving signal and outputting the first test receiving signal and the second test receiving signal. The signal analyzer, electrically coupled to the microprocessor and the up/down-conversion circuit, is for analyzing gain values and phase offset amount of the first test receiving signal and the second test receiving signal outputted from the up/down-conversion circuit, and generating a gain correction table and a phase correction table. In addition, the up/down-conversion circuit performs gain compensation/attenuation according to the gain correction table, the transmitting/receiving circuit performs phase correction according to the phase correction table.

In an embodiment of the invention, the transmitting/receiving circuit comprises at least one first control chip, the first control chip is connected to the corresponding antenna unit to be tested, so as to receive the control signal for turning on the antenna unit to be tested.

In an embodiment of the invention, the transmitting/receiving circuit further comprises: a power divider, a sharing unit, a transmitting unit, a receiving unit, and a switch module. The power divider is for receiving a first radio frequency (RF) signal sent by the up/down-conversion circuit, and receiving a second RF signal transmitted by the array antenna. The sharing unit, electrically coupled to the power divider, includes a phase shifter and an attenuator, wherein the phase shifter is for phase adjustment. The transmitting unit, electrically coupled to the sharing unit, includes a driving amplifier and a power amplifier. The receiving unit, electrically coupled to the sharing unit, includes a low noise amplifier and a bandpass filter. The switch module includes a first switch unit and a second switch unit, wherein the first switch unit is electrically coupled to the sharing unit, the transmitting unit, and the receiving unit; the second switch unit is electrically coupled to the transmitting unit, the receiving unit, and the antenna unit to be tested. In addition, the first control chip is for receiving the control signal outputted by the microprocessor, so as to control the phase shifter and the attenuator, and for controlling the switch module so as to control turning on or off of the antenna unit to be tested.

In an embodiment of the invention, the first test transmission signal and the second test transmission signal are digital modulation signals.

In an embodiment of the invention, the digital modulation signals are based on one of digital modulation schemes including quadrature phase-shift keying (QPSK), 8-phase-shift keying (8PSK), and amplitude and phase-shift keying (APSK) modulation.

In an embodiment of the invention, the signal analyzer performs a gain analysis of the first test receiving signal and the second test receiving signal, based on computations of coordinates of in-phase (I) or quadrature (Q) axis coordinates with respect to the first test receiving signal and the second test receiving signal, and obtains corresponding I and Q coordinates, based on which a constellation diagram can be obtained correspondingly.

In an embodiment of the invention, the first test receiving signal includes two sets of waveforms, the signal analyzer obtains a gain value based on a difference between the two sets of waveforms, and stores the gain value in the gain correction table.

In an embodiment of the invention, the DC offset generator generates the DC offset through a controller, and the DC offset signal is a known DC offset signal.

In an embodiment of the invention, the DC offset generator is a voltage-level phase shifter or bias tee.

In an embodiment of the invention, the signal analyzer generates the phase correction table by at least following operations, wherein: the signal analyzer analyzes the first test transmission signal, so as to obtain a first set of I and Q coordinates, and accordingly obtain a first constellation diagram with a phase angle of $\phi 1$; the signal analyzer analyzes the first test receiving signal and the second test receiving signal, so as to obtain a second set and a third set of I and Q coordinates, respectively, and accordingly obtain a second constellation diagram with a phase angle of $\phi 2$ and a third constellation diagram with a phase angle of $\phi 3$ respectively; a first relative offset amount of the first test receiving signal and the second test receiving signal due to a known DC is obtained based on a difference value between the phase angles of $\phi 2$ and $\phi 3$; a second relative offset amount of the first test transmission signal and the second test receiving signal is obtained based on a difference value between the phase angles of $\phi 1$ and $\phi 3$; a phase offset amount of the first test transmission signal and the first test receiving signal is obtained based on the second relative offset amount minus the first relative offset amount; the phase offset amount is stored in the phase correction table.

According to at least the object, the invention further provides a method for array antenna failure detection and antenna self-correction, comprising the following steps. A third test transmission signal is generated to an antenna unit to be tested sequentially, by a signal generator, wherein the antenna unit to be tested transmits the third test transmission signal to a reference antenna unit. A third test receiving signal sent from the reference antenna unit is analyzed, and a gain value is computed so as to generate a gain correction table, by a signal analyzer. At least two fourth test transmission signals by the signal generator are generated, wherein one of the fourth test transmission signals is sent to an up/down-conversion circuit, and then to the antenna unit to be tested; and another one of the fourth test transmission signals is sent to a DC offset generator which generates a DC offset signal, and sends a fifth test transmission signal based on the fourth test transmission signal and the DC offset signal to the up/down-conversion circuit, and then to the antenna unit to be tested, wherein the antenna unit to be tested transmits the fourth test transmission signal and the fifth test transmission signal to the reference antenna unit, respectively. In response, a fourth test receiving signal and a fifth test receiving signal are sent from the reference antenna unit to the up/down-conversion circuit, wherein the up/down-conversion circuit performs gain compensation/attenuation according to the gain correction table. A phase offset amount is analyzed and a phase correction table is generated by the signal analyzer, based on the fourth test transmission signal, the fourth test receiving signal and the fifth test receiving signal. Phase correction is performed on the antenna unit to be tested according to the phase correction table by a transmitting/receiving circuit.

In an embodiment of the invention, the third test transmission signal, the fourth test transmission signal, and the fifth test transmission signal are digital modulation signals.

In an embodiment of the invention, the digital modulation signals are based on one of digital modulation schemes including quadrature phase-shift keying (QPSK), 8-phase-shift keying (8PSK), and amplitude and phase-shift keying (APSK) modulation.

In an embodiment of the invention, the signal analyzer performs a gain analysis of the fourth test receiving signal and the fifth test receiving signal, based on computations of I or Q axis with respect to the fourth test receiving signal and the fifth test receiving signal, and obtains corresponding I and Q coordinates, based on which a constellation diagram can be obtained correspondingly.

In an embodiment of the invention, the third test receiving signal sent from the antenna unit to be tested and the reference antenna unit includes two sets of waveforms, the signal analyzer obtains a gain value based on a difference between peak values of the two sets of waveforms, and stores the gain value in the gain correction table.

In an embodiment of the invention, the DC offset generator generates the DC offset through a controller, and the DC offset signal is a known DC offset signal.

In an embodiment of the invention, the DC offset generator is a voltage-level phase shifter or bias tee.

In an embodiment of the invention, the phase correction table is generated by steps including: analyzing, by the signal analyzer, the fourth test transmission signal, so as to obtain a first set of in-phase (I) and quadrature (Q) coordinates, and accordingly obtain a first constellation diagram with a phase angle of $\phi 1$; analyzing, by the signal analyzer, the fourth test receiving signal and the fifth test receiving signal, so as to obtain a second set and a third set of I and Q coordinates, respectively, and accordingly obtain a second constellation diagram with a phase angle of $\phi 2$ and a third constellation diagram with a phase angle of $\phi 3$ respectively; obtaining a first relative offset amount of the fourth test receiving signal and the fifth test receiving signal due to the DC offset signal, based on a difference value between the phase angles of $\phi 2$ and $\phi 3$; obtaining a second relative offset amount of the fourth test transmission signal and the fifth test receiving signal, based on a difference value between the phase angles of $\phi 1$ and $\phi 3$; obtaining a phase offset amount of the fourth test transmission signal and the fourth test receiving signal, based on the second relative offset amount minus the first relative offset amount; and storing the phase offset amount in the phase correction table.

Hence, in the array antenna failure detection and antenna self-correction system according to the invention, a signal analyzer is employed to perform gain analysis so as to perform gain attenuation/compensation, and a DC offset generator is employed to generate a set of known offset amounts which are added to signals, so that, at the receiving end, a phase offset amount can be derived based on comparisons with the original signal, and antenna correction can then be performed accordingly. In this way, computational complexity of the system can be reduced, and the speed of antenna correction can be increased.

DETAILED DESCRIPTION OF THE PREFERRED EMBODIMENTS

To better understanding of the above object, characteristics and effects of this invention, various embodiments will be taken with the attached drawings for the detailed description as follows.

Figure 1:
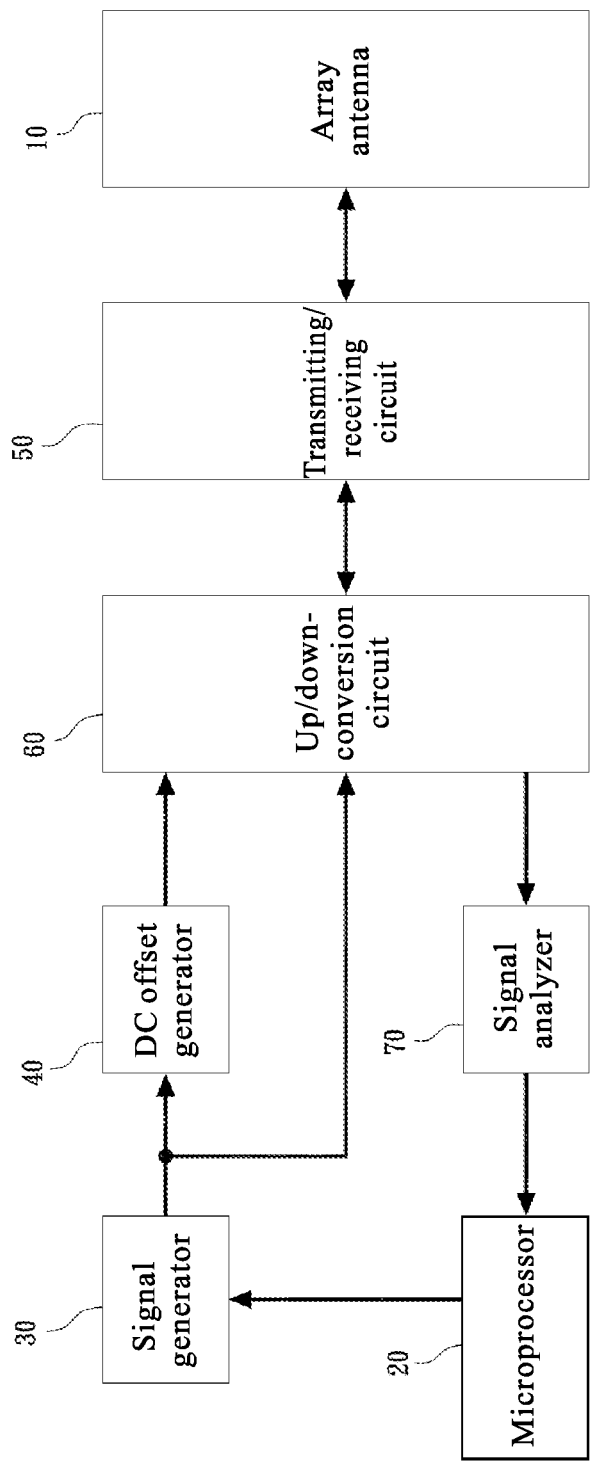
FIG. 1 is a schematic diagram illustrating the architecture of an array antenna failure detection and antenna self-correction system according to an embodiment of the invention.
Figure 2:
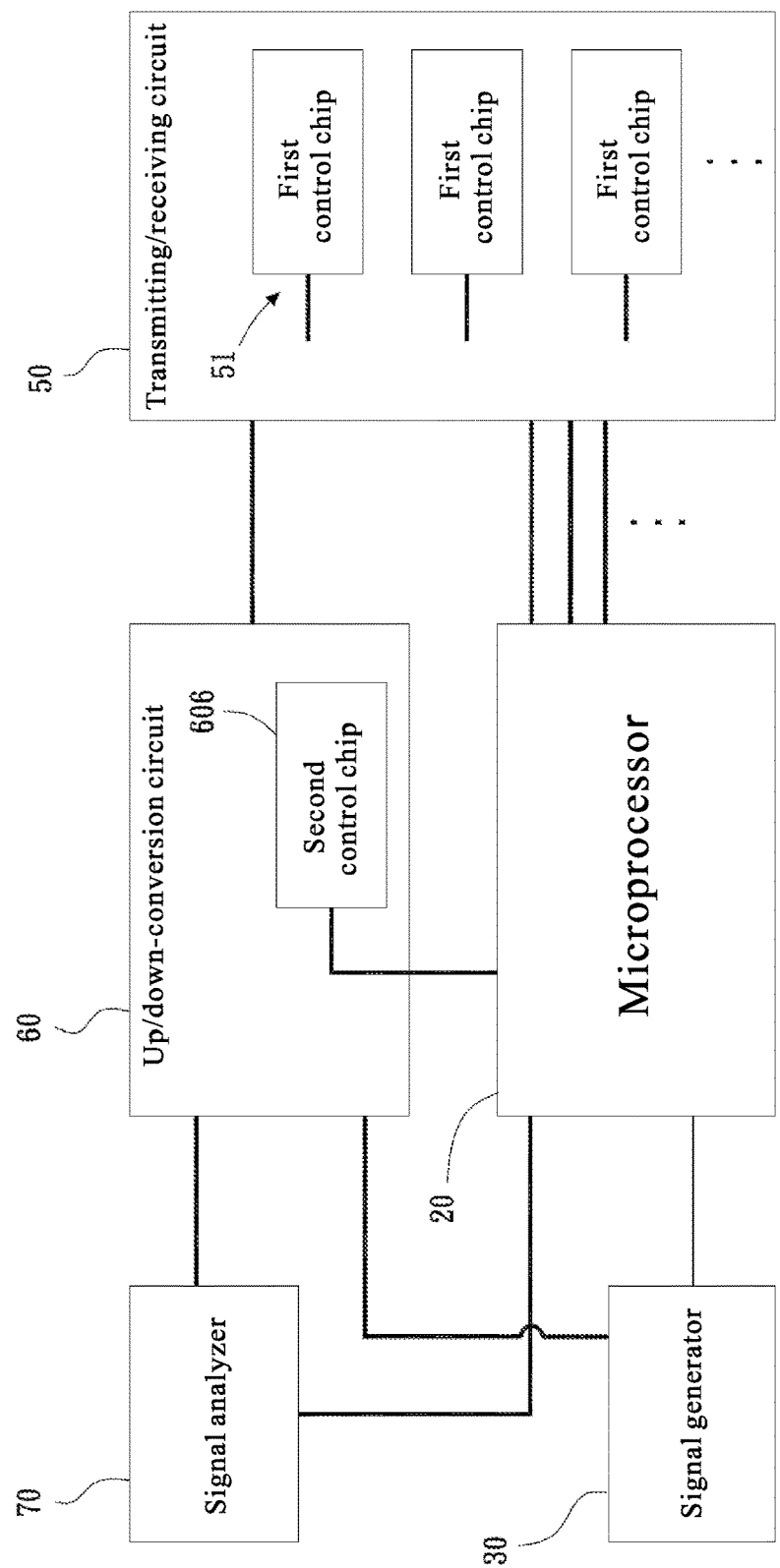
FIG. 2 is a schematic diagram illustrating the architecture of an array antenna failure detection and antenna self-correction system according to an embodiment of the invention.

Referring to FIGS. 1 and 2, an array antenna failure detection and antenna self-correction system is illustrated according to an embodiment of the invention. As shown in the Figures, the system comprises: an array antenna 10, a microprocessor 20, a signal generator 30, a DC offset generator 40, a transmitting/receiving circuit 50, an up/down-conversion circuit 60, and a signal analyzer 70.

The array antenna 10 comprises at least one antenna unit to be tested 11 and a reference antenna, wherein the reference antenna is electrically coupled to the antenna unit to be tested 11, and the reference antenna can be used for generating a standard radiation pattern.

The microprocessor 20, electrically coupled to the signal generator 30, the transmitting/receiving circuit 50, the up/down-conversion circuit 60, and the signal analyzer 70, is used for outputting a control signal for controlling the signal generator 30, the transmitting/receiving circuit 50, the up/down-conversion circuit 60, and the signal analyzer 70.

The signal generator 30, electrically coupled to the microprocessor 20, is used for receiving the control signal and generating a first test transmission signal, which is outputted to the up/down-conversion circuit 60.

The DC offset generator 40, electrically coupled to the signal generator 30, the DC offset generator 40, is employed for generating a direct current (DC) offset signal, so as to perform a DC offset operation on the first test transmission signal and generate a second test transmission signal. The DC offset generator 40 generates the DC offset through a controller (not shown), wherein the DC offset signal is a known (or given) DC offset signal. In addition, the DC offset generator may be a voltage-level phase shifter or bias tee, but the invention is not limited to the examples.

Each of the first test transmission signal and the second test transmission signal, as depicted above, are digital modulation signals; and the digital modulation signals may be based on one of digital modulation schemes including QPSK, 8PSK, and APSK modulation, but the invention is not limited to the examples.

The transmitting/receiving circuit 50, electrically coupled to the microprocessor 20 and the array antenna 10, is used for receiving the control signal and sending the first test transmission signal and the second test transmission signal to the array antenna, and receiving a first test receiving signal and a second test receiving signal sent by the array antenna in response.

Figure 3:
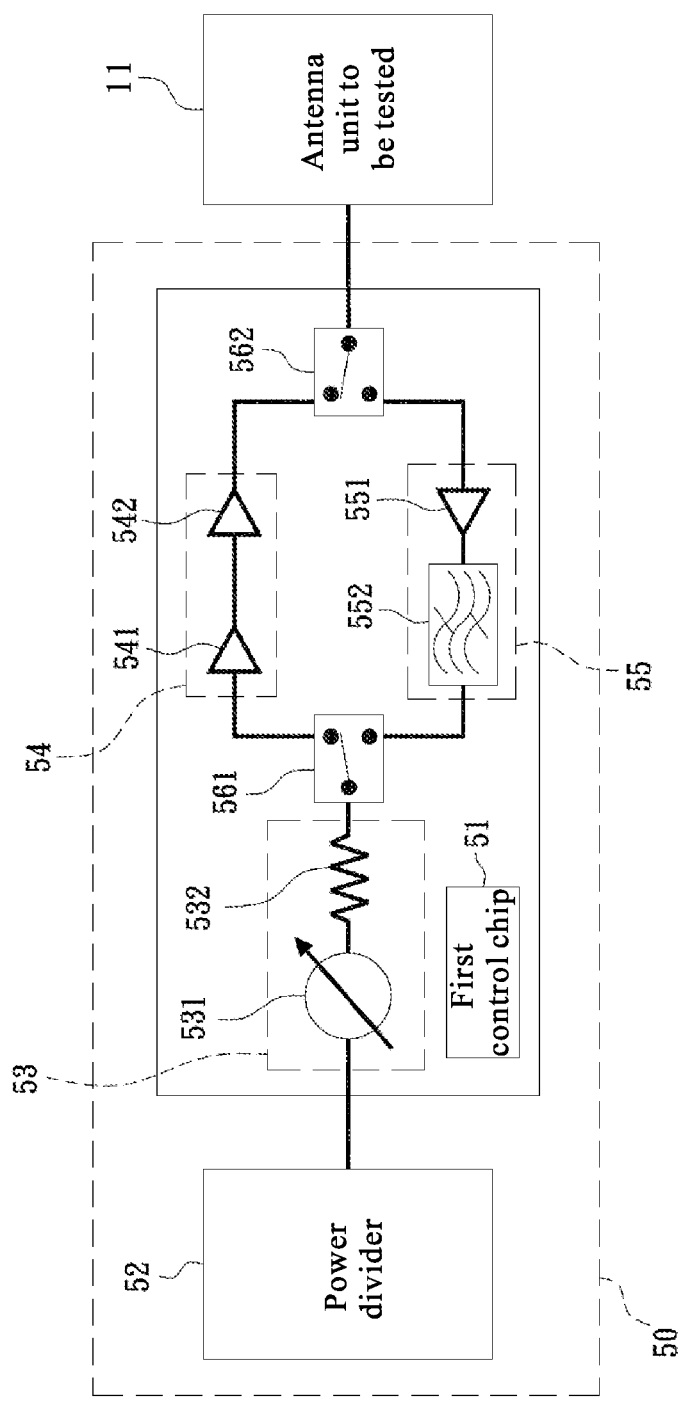
FIG. 3 is a circuit diagram illustrating a transmitting/receiving circuit of an array antenna failure detection and antenna self-correction system according to an embodiment of the invention.

In addition, referring to FIG. 3, the transmitting/receiving circuit 50 includes at least one first control chip 51, a power divider 52, a sharing unit 53, a transmitting unit 54, a receiving unit 55, and a switch module 56.

The switch module 56 includes a first switch unit 561 and a second switch unit 562. The first switch unit 561 has one terminal electrically coupled to the sharing unit 53, and the first switch unit 561 has another terminal electrically coupled to the transmitting unit 54 and the receiving unit 55. One terminal of the second switch unit 562 is electrically coupled to the transmitting unit 54 and the receiving unit 55, and another terminal of the second switch unit 562 is electrically coupled to an antenna unit to be tested 11. In this way, the first switch unit 561 and the second switch unit 562 are used for coupling the sharing unit 53 and the antenna unit to be tested 11 to the transmitting unit 54 and the receiving unit 55, respectively, so as to perform switching between transmission or receiving functionality.

The first control chip 51, coupled to a corresponding antenna unit to be tested 11, is used for receiving the control signal outputted by the microprocessor 20 so as to turn on the antenna unit to be tested 11 which is to be measured. The power divider 52 is used for receiving a first RF signal sent by the up/down-conversion circuit 60, and receiving a second RF signal transmitted by the array antenna. The sharing unit 53 has one terminal electrically coupled to the power divider 52, and another terminal electrically coupled to the transmitting unit 54 and the receiving unit 55. The sharing unit 53 includes a phase shifter 531 and an attenuator 532. In addition, it is noted that the phase shifter 531 may be implemented with any maximum phase shifting angle and resolution according to requirements, and the attenuator 532 may also be implemented with any maximum range of attenuation and resolution according to requirements.

The transmitting unit 54 is formed based on an amplifier of multiple stages, and for example includes a driving amplifier 541 and a power amplifier 542. The transmitting unit 54 can be realized with a different number of cascaded components according to requirements for gains or power. The receiving unit 55 includes a low noise amplifier 551 and a bandpass filter 552, for achieving the characteristics of high gain and low noise. The transmitting unit 54 and the receiving unit 55 are connected to a conversion circuit for circuit matching, and connected to the antenna unit to be tested 11 for signal transmission or receiving.

When an antenna detection or correction mode is performed, the microprocessor 10 sends a control signal to the first control chip 51 of the transmitting/receiving circuit 50, so as to control the phase shifter 531 and the attenuator 532, and control the turning on or off of the antenna unit to be tested 11, wherein the phase shifter 531 is for phase adjustment.

The up/down-conversion circuit 60, electrically coupled to the microprocessor 20, the signal generator 30, the DC offset generator 40, and the transmitting/receiving circuit 50, is used for receiving the first test transmission signal and the second test transmission signal and sending the first test transmission signal and the second test transmission signal to the transmitting/receiving circuit 50, and receiving the first test receiving signal and the second test receiving signal and sending the first test receiving signal and the second test receiving signal to a signal analyzer 70.

Figure 4:
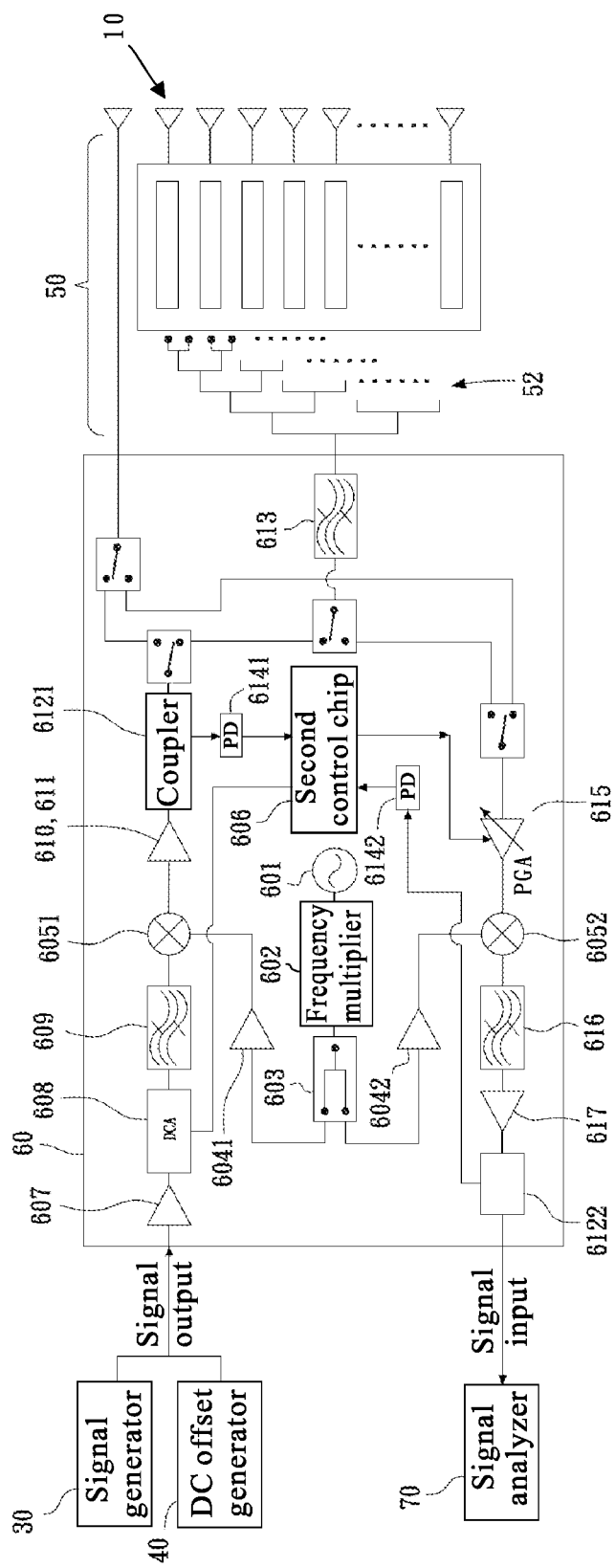
FIG. 4 is a circuit diagram illustrating an up/down-conversion circuit of an array antenna failure detection and antenna self-correction system according to an embodiment of the invention.

In addition, referring to FIG. 4, the up/down-conversion circuit 60 includes an oscillator 601 for generating a reference clock signal. The reference clock signal is firstly up-converted by a frequency multiplier 602 for frequency up-conversion, and the up-converted reference clock signal is applied to two paths through a power divider 603. Each of the paths includes amplifiers 6041 and 6042 for signal amplification, finally generating a local signal; and the local signals are applied to frequency mixers 6051 and 6052 for the transmission path and receiving path, respectively. The transmission path and receiving path of the up/down-conversion circuit 60 is switched by using a second control chip 606 which sends a control signal to a switch. In the transmission path, the first test transmission signal from the signal generator 30 or the second test transmission signal from the DC offset generator 40 is firstly processed by an amplifier 607 and a digital controlled amplifier (DCA) 608 for gain enhancement, and filtered by a bandpass filter 609, and forwarded to a frequency mixer 6051 for the mixing with a local signal, and then passed through a series of a driving amplifier 610 and a power amplifier 611, so that the first RF signal is outputted. The first RF signal is finally processed by using a coupler 6121 so as to be applied to two paths. In the first path, the first RF signal is sent to a filter 613 via at least one switch, and forwarded to the power divider 52 of the transmitting/receiving circuit 50. In the second path, the first RF signal is sent to a power detection (PD) 6141 for signal strength measurement, and the PD 6141 sends a message to the second control chip 606 which is for adjusting a gain amount outputted by the DCA 608, according to requirements for the gain and power strength of a transmission signal. In the receiving path, the second RF signal received by the power divider 52 of the transmitting/receiving circuit 50 is passed through, sequentially, the filter 613 and the switches, and amplified by a number of serial-connected low noise amplifiers, and sent to a programmable gain amplifier (PGA) 615 for gain control, and forwarded to the frequency mixer 6052 to mix with a local signal for removing a carrier wave, and finally passed through a bandpass filter 616 and an amplifier 617, so as to recover an original signal. The recovered original signal is sent to a coupler 6122 so as to be applied to two paths. In the first path, the original signal is directly sent to the signal analyzer 70. In the second path, the recovered original signal is sent to the PD 6142 for signal strength measurement; and the PD 6142 sends a message to the second control chip 606 which is for adjusting a gain amount outputted by the PGA 615, according to requirements for the gain and power strength of a receiving signal.

The signal analyzer 70, electrically coupled to the microprocessor 10 and the up/down-conversion circuit 60, is employed to analyze the gain values and phase offset amount of the first test receiving signal and the second test receiving signal, and generating a gain correction table and a phase correction table. The up/down-conversion circuit 60 performs gain compensation/attenuation according to the gain correction table, and the transmitting/receiving circuit 50 performs phase correction according to the phase correction table.

In addition, the signal analyzer 70 performs a gain analysis of the first test receiving signal and the second test receiving signal, based on computations of coordinates of in-phase (I) or quadrature (Q) axis with respect to the first test receiving signal and the second test receiving signal, and obtains corresponding I and Q coordinates, based on which a constellation diagram can be obtained correspondingly.

For example, the first test receiving signal includes two sets of waveforms, one set of which is from the antenna unit to be tested 11, and another set of which is from the reference antenna, wherein the reference antenna is indicated as an antenna unit in the top right side in FIG. 4. In addition, the signal analyzer 70 obtains a gain value based on a difference between peak values of the two sets of waveforms, and stores the gain value in the gain correction table.

Figure 5:
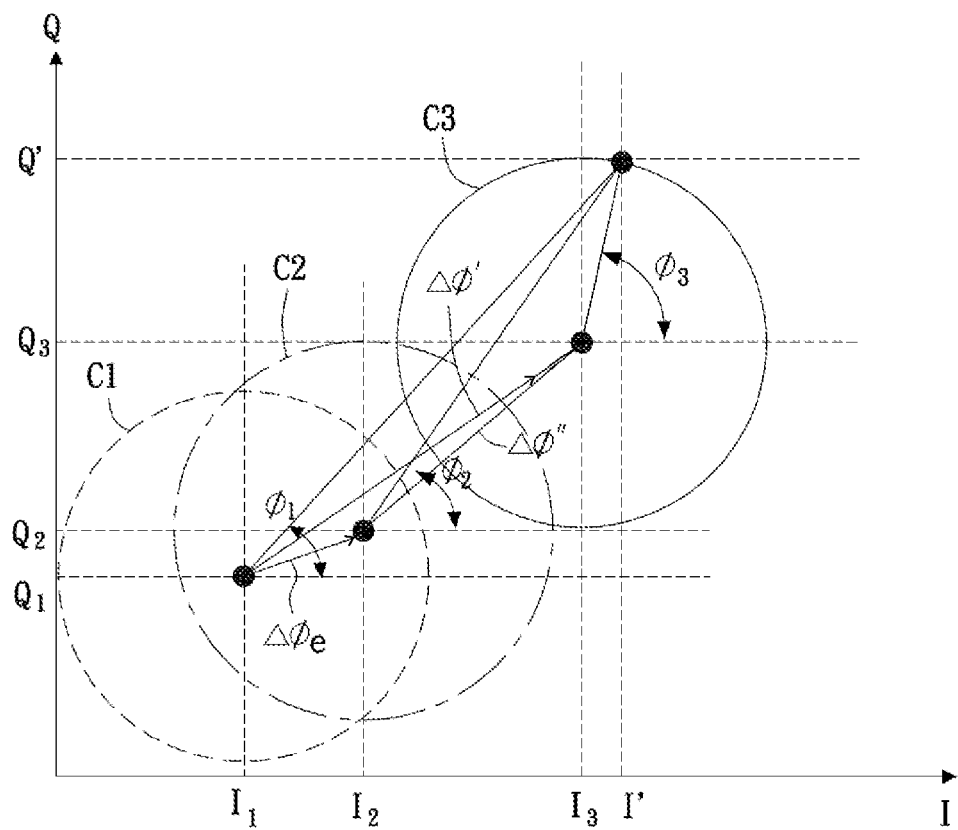
FIG. 5 is a constellation diagram illustrating an array antenna failure detection and antenna self-correction system and method according to an embodiment of the invention.

Referring to FIG. 5, the generation of the phase correction table is illustrated, and includes the following steps:

(1) The signal analyzer 70 analyzes the first test transmission signal, so as to obtain a first set of I and Q coordinates, based on which a first constellation diagram C1 can be obtained by computation and plotting as shown, wherein the first constellation diagram C1 has a phase angle of $\phi 1$. (2) The signal analyzer 70 analyzes the first test receiving signal and the second test receiving signal, so as to obtain a second set of I and Q coordinates and a third set of I and Q coordinates, respectively, based on which a second constellation diagram C2 and a third constellation diagram C3 can be obtained, wherein the second constellation diagram C2 has a phase angle of $\phi 2$, the third constellation diagram C3 has a phase angle of $\phi 3$. (3) A first relative offset amount $\Delta\phi''$ of the first test receiving signal and the second test receiving signal due to a known DC is obtained based on a difference value between the phase angles of $\phi 2$ and $\phi 3$. (4) A second relative offset amount $\Delta\phi'$ of the first test transmission signal and the second test receiving signal is obtained based on a difference value between the phase angles of $\phi 1$ and $\phi 3$. (5) A phase offset amount $\Delta\phi_e$ of the first test transmission signal and the first test receiving signal is obtained based on the second relative offset amount $\Delta\phi'$ minus the first relative offset amount $\Delta\phi''$. (6) The phase offset amount $\Delta\phi_e$ is stored in the phase correction table.

Hence, in the array antenna failure detection and antenna self-correction system according to the invention, a signal analyzer is employed to perform gain analysis so as to perform gain attenuation/compensation, and a DC offset generator is employed to generate a set of known offset amounts which are added to signals, so that, at the receiving end, a phase offset amount can be derived based on comparisons with the original signal, and antenna correction can then be performed accordingly. In this way, computational complexity of the system can be reduced, and the speed of antenna correction can be increased.

Figure 6:
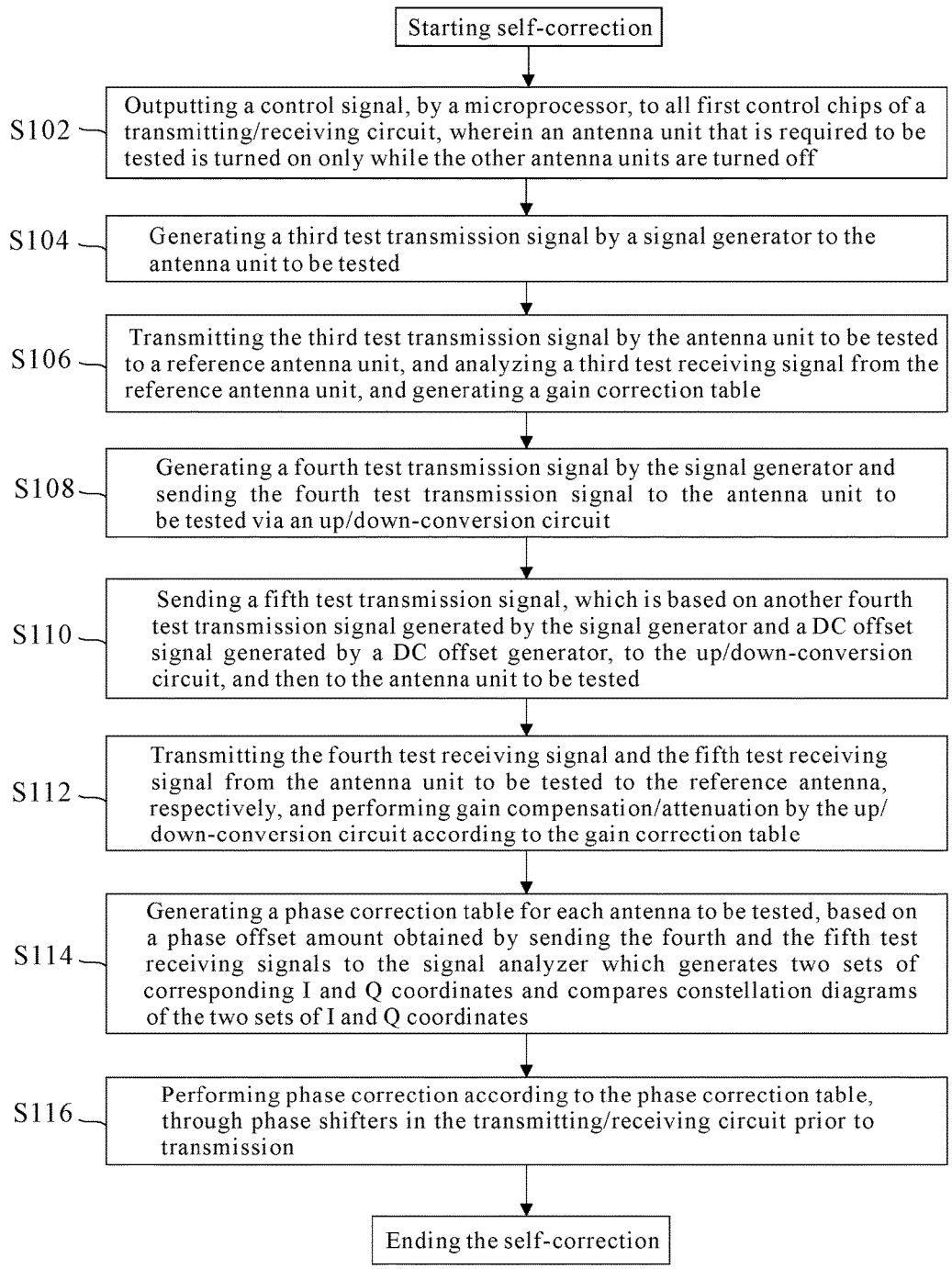
FIG. 6 is a flowchart illustrating an array antenna failure detection and antenna self-correction method according to an embodiment of the invention.

Referring to FIG. 6, a method for array antenna failure detection and antenna self-correction is illustrated according to an embodiment of the invention in a flowchart. The method includes steps S102 to S116 as following.

In step S102, a control signal is outputted by a microprocessor to all first control chips of a transmitting/receiving circuit. The first control chip of the transmitting/receiving circuit is employed to control and make connection to a corresponding antenna unit to be tested. In addition, an antenna unit that is required to be tested is turned on only while the other antenna units are turned off.

In step S104, a third test transmission signal is generated by a signal generator to the up/down-conversion circuit, and then sent to a reference antenna via the antenna unit to be tested. For example, a plurality of third test transmission signals can be generated based on a random distribution such as Gaussian distribution, and so on, which can be selected according to the actual correction speed and precision; and the invention is not limited thereto. In addition, the third test transmission signals are required to be digital modulation signals, such as QPSK, 8PSK, or APSK signals, but the invention is not limited to the examples.

In step S106, the signal received by the reference antenna is sent to the signal analyzer through the transmitting/receiving circuit and the up/down-conversion circuit in order for the signal analyzer to perform a gain analysis and compute mean values for the generation of a gain correction table. For example, the mean values can be computed based on quadratic mean (or root mean square), but the invention is not limited thereto. For example, a plurality of signals are received by the reference antenna, in response to the third test transmission signals from one antenna to be tested; and the gain analysis are performed on the received signals and compute the mean value accordingly. The step S106 can be performed for each of the antenna to be tested so as to obtain the mean values for the gain correction table.

In step S108~S112, two identical fourth test transmission signals are generated by the signal generator, and processed via two paths. One of the fourth test transmission signals is directly sent to the up/down-conversion circuit, and then sent to the antenna unit to be tested. In addition, another one of the fourth test transmission signals is sent to a DC offset generator; the DC offset generator generates a DC offset signal, and sends a fifth test transmission signal which is based on or a combination of the fourth test transmission signal and the DC offset signal to the up/down-conversion circuit, and then to the antenna unit to be tested. For example, the fourth test transmission signal and the fifth test transmission signal are digital modulation signals, which may be based on one of digital modulation schemes such as QPSK, 8PSK, and APSK modulation, but the invention is not limited to the examples. The antenna unit to be tested transmits the fourth test transmission signal and the fifth test transmission signal to the reference antenna respectively; and in response, the reference antenna sends a fourth test receiving signal and a fifth test receiving signal to the up/down-conversion circuit; and the up/down-conversion circuit performs gain compensation/attenuation according to the gain correction table.

In step S114, a constellation diagram is obtained based on the fourth test receiving signal and the fifth test receiving signal by the signal analyzer. The constellation diagram can be illustrated with two circles, wherein one circle corresponds to a signal with DC offset, and another one corresponds to a signal without DC offset. A phase offset amount can then be obtained by computations, and a mean value can be taken, for example, based on the phase offset amounts for a plurality of fourth and fifth test receiving signals due to a plurality of fourth and fifth test transmission signals, and a phase correction table can be generated based on the phase offset amount. For example, the mean value can be taken by weighted sum, but the invention is not limited thereto.

In step S116, prior to transmission, antenna self-correction can be achieved by performing phase correction on the antenna unit(s) to be tested respectively, according to the phase correction table, through phase shifters in the transmitting/receiving circuit.

In addition, the signal analyzer performs a gain analysis of the fourth test receiving signal and the fifth test receiving signal, based on computations of coordinates of I or Q axis with respect to the fourth test receiving signal and the fifth test receiving signal, and obtains corresponding I and Q coordinates, based on which a constellation diagram can be obtained correspondingly.

Besides, the third test receiving signal sent from the antenna unit to be tested and the reference antenna unit includes two sets of waveforms, the signal analyzer obtains a gain value based on a difference between peak values of the two sets of waveforms, and stores the gain value in the gain correction table.

Further, the DC offset generator generates the DC offset through a controller, wherein the DC offset signal is a known (or given) DC offset signal.

For example, the DC offset generator is a voltage-level phase shifter or bias tee, but the invention is not limited to the examples.

In an example, referring to FIG. 5, the generation of the phase correction table may include the following steps. (1) The fourth test transmission signal is analyzed by the signal analyzer so as to obtain a first set of I and Q coordinates, and accordingly obtain a first constellation diagram C1 with a phase angle of $\phi 1$. (2) The fourth test receiving signal and the fifth test receiving signal are analyzed by the signal analyzer so as to obtain a second set of I and Q coordinates and a third set of I and Q coordinates, respectively, and accordingly obtain a second constellation diagram C2 with a phase angle of $\phi 2$ and a third constellation diagram with a phase angle of $\phi 3$ respectively. (3) A first relative offset amount $\Delta \phi''$ of the fourth test receiving signal and the fifth test receiving signal due to a known DC is obtained based on a difference value between the phase angles of $\phi 2$ and $\phi 3$. (4) A second relative offset amount $\Delta \phi'$ of the fourth test transmission signal and the fifth test receiving signal is obtained based on a difference value between the phase angles of $\phi 1$ and $\phi 3$. (5) A phase offset amount $\Delta \phi_e$ of the fourth test transmission signal and the fourth test receiving signal is obtained based on the second relative offset amount $\Delta \phi'$ minus the first relative offset amount $\Delta \phi''$. (6) The phase offset amount $\Delta \phi_e$ is stored in the phase correction table.

Further, in implementation of the system or the method as exemplified above, correction process can be performed on at least one or all of the antenna units of the array antenna 10. For correction of an antenna to be tested, a test transmission signal, such as one of the first to fifth test transmission signal as illustrated above, indicates one of a plurality of the test transmission signals (or a plurality of pieces of test transmission data) which can be based on a digital modulation scheme. Correspondingly, a test receiving signal, such as one of the first to fifth test receiving signal as illustrated above, indicates one of a plurality of the test receiving signals (or a plurality of pieces of test receiving data) which are based on the digital modulation scheme.

In other words, for example, a plurality of fourth and fifth test transmission signals based on a digital modulation scheme (such as QPSK or 8PSK) are transmitted by an antenna unit to be tested to a reference antenna unit, and in response, the reference antenna unit sends a plurality of fourth and fifth test receiving signals to the up/down-conversion circuit and so on for the following processing for example illustrated in FIG. 5. Hence, the first set of I and Q coordinates are obtained based on the fourth test transmission signals; the second set of I and Q coordinates are obtained based on the fourth test receiving signals; and the third set of I and Q coordinates are obtained based on the fifth test receiving signals; so that the first, second, and third constellation diagrams C1, C2, and C3 can be plotted or computed. In addition, each of the circles as indicated is obtained by a scatter plot of the corresponding set of I and Q coordinates, and has the same (or approximately) radius related to amplitudes of the signals. Further, as shown in FIG. 5, the centers of the circles can be determined by constellation points $(I_1, Q_1)$ and $(I_3, Q_3)$ based on the corresponding sets of I and Q coordinates; and a constellation point $(I', Q')$ is an arbitrary point on the circle of the third constellation diagram C3, indicative of a receiving signal (or a piece of receiving data). Thus, the phase angle of $\phi 1$ is the phase angle of the constellation point $(I', Q')$ with respect to the constellation point $(I_1, Q_1)$ (i.e., a relative origin); and the phase angle of $\phi 2$ and $\phi 3$ can be determined similarly.

Furthermore, for example, the first, second, and third constellation diagrams C1, C2, and C3 may indicate original modulation signals, the test receiving signals due to internal DC offset by one or more components of the system, and the test receiving signals due to the internal DC offset and a known DC offset (e.g., by a DC offset generator). As such, the phase shift offset amount $\Delta\phi_e$ which indicates the internal DC offset can be determined and phase correction can be performed accordingly. However, the invention is not limited thereto.

While the invention has been described by means of specific embodiments, numerous modifications and variations could be made thereto by those skilled in the art without departing from the scope and spirit of the invention set forth in the claims.

What is claimed is:

1. An array antenna failure detection and antenna self-correction system, comprising:
    an array antenna, comprising at least one antenna unit to be tested and a reference antenna, the reference antenna being electrically coupled to the antenna unit to be tested;
    a microprocessor, for outputting a control signal;
    a signal generator, electrically coupled to the microprocessor, for receiving the control signal and generating a first test transmission signal; a direct current (DC) offset generator, electrically coupled to the signal generator, for generating a DC offset signal, so as to perform a DC offset operation on the first test transmission signal and generate a second test transmission signal;
    a transmitting/receiving circuit, electrically coupled to the microprocessor and the array antenna, for receiving the control signal and sending the first test transmission signal and the second test transmission signal to the array antenna, and receiving a first test receiving signal and a second test receiving signal from the array antenna;
    an up/down-conversion circuit, electrically coupled to the microprocessor, the signal generator, the DC offset generator and the transmitting/receiving circuit, for receiving the first test transmission signal and the second test transmission signal and sending the first test transmission signal and the second test transmission signal to the transmitting/receiving circuit, and receiving the first test receiving signal and the second test receiving signal, which are to be outputted; and
    a signal analyzer, electrically coupled to the microprocessor and the up/down-conversion circuit, for analyzing gain values and phase offset amount of the first test receiving signal and the second test receiving signal outputted from the up/down-conversion circuit, and generating a gain correction table and a phase correction table;
    wherein the up/down-conversion circuit performs gain compensation/attenuation according to the gain correction table, the transmitting/receiving circuit performs phase correction according to the phase correction table.

2. The array antenna failure detection and antenna self-correction system as claimed in claim 1, wherein the transmitting/receiving circuit comprises at least one first control chip, the first control chip is connected to the corresponding antenna unit to be tested, so as to receive the control signal for turning on the antenna unit to be tested.

3. The array antenna failure detection and antenna self-correction system as claimed in claim 2, wherein the transmitting/receiving circuit further comprises:
    a power divider, for receiving a first radio frequency (RF) signal sent by the up/down-conversion circuit, and receiving a second RF signal transmitted by the array antenna;
    a sharing unit, electrically coupled to the power divider, comprising a phase shifter and an attenuator, wherein the phase shifter is for phase adjustment;
    a transmitting unit, electrically coupled to the sharing unit, comprising a driving amplifier and a power amplifier;
    a receiving unit, electrically coupled to the sharing unit, comprising a low noise amplifier and a bandpass filter; and
    a switch module, comprising a first switch unit and a second switch unit, wherein the first switch unit is electrically coupled to the sharing unit, the transmitting unit, and the receiving unit; the second switch unit is electrically coupled to the transmitting unit, the receiving unit, and the antenna unit to be tested;
    wherein the first control chip is for receiving the control signal outputted by the microprocessor, so as to control the phase shifter and the attenuator, and for controlling the switch module so as to control turning on or off of the antenna unit to be tested.

4. The array antenna failure detection and antenna self-correction system as claimed in claim 1, wherein the first test transmission signal and the second test transmission signal are digital modulation signals.

5. The array antenna failure detection and antenna self-correction system as claimed in claim 4, wherein the digital modulation signals are based on one of digital modulation schemes including quadrature phase-shift keying (QPSK), 8-phase-shift keying (8PSK), or amplitude and phase-shift keying (APSK) modulation.

6. The array antenna failure detection and antenna self-correction system as claimed in claim 1, wherein the signal analyzer performs a gain analysis of the first test receiving signal and the second test receiving signal, based on computations of coordinates of in-phase (I) or quadrature (Q) axis with respect to the first test receiving signal and the second test receiving signal, and obtains corresponding I and Q coordinates, based on which a constellation diagram can be obtained correspondingly.

7. The array antenna failure detection and antenna self-correction system as claimed in claim 1, wherein the first test receiving signal includes two sets of waveforms, the signal analyzer obtains a gain value based on a difference between the two sets of waveforms, and stores the gain value in the gain correction table.

8. The array antenna failure detection and antenna self-correction system as claimed in claim 1, wherein the DC offset generator generates the DC offset through a controller, and the DC offset signal is a known DC offset signal.

9. The array antenna failure detection and antenna self-correction system as claimed in claim 8, wherein the DC offset generator is a voltage-level phase shifter or bias tee.

10. The array antenna failure detection and antenna self-correction system as claimed in claim 1, wherein the signal analyzer generates the phase correction table by at least following operations, wherein:
    the signal analyzer analyzes the first test transmission signal, so as to obtain a first set of in-phase (I) and quadrature (Q) coordinates, and accordingly obtain a first constellation diagram with a phase angle of $\phi1$;

the signal analyzer analyzes the first test receiving signal and the second test receiving signal, so as to obtain a second set of I and Q coordinates and a third set of I and Q coordinates, respectively, and accordingly obtain a second constellation diagram with a phase angle of ϕ2 and a third constellation diagram with a phase angle of ϕ3 respectively;

a first relative offset amount of the first test receiving signal and the second test receiving signal due to a known DC is obtained based on a difference value between the phase angles of ϕ2 and ϕ3;

a second relative offset amount of the first test transmission signal and the second test receiving signal is obtained based on a difference value between the phase angles of ϕ1 and ϕ3;

a phase offset amount of the first test transmission signal and the first test receiving signal is obtained based on the second relative offset amount minus the first relative offset amount;

the phase offset amount is stored in the phase correction table.

11. A method for array antenna failure detection and antenna self-correction, comprising steps of:

generating a third test transmission signal to an antenna unit to be tested sequentially, by a signal generator, wherein the antenna unit to be tested transmits the third test transmission signal to a reference antenna unit;

analyzing a third test receiving signal sent from the reference antenna unit, and computing a gain value so as to generate a gain correction table, by a signal analyzer;

generating at least two fourth test transmission signals by the signal generator, wherein one of the fourth test transmission signals is sent to an up/down-conversion circuit, and then to the antenna unit to be tested; and another one of the fourth test transmission signals is sent to a DC offset generator which generates a DC offset signal and sends a fifth test transmission signal based on the fourth test transmission signal and the DC offset signal to the up/down-conversion circuit, and then to the antenna unit to be tested, wherein the antenna unit to be tested transmits the fourth test transmission signal and the fifth test transmission signal to the reference antenna unit, respectively;

in response, sending a fourth test receiving signal and a fifth test receiving signal from the reference antenna unit to the up/down-conversion circuit, wherein the up/down-conversion circuit performs gain compensation/attenuation according to the gain correction table;

analyzing a phase offset amount and generating a phase correction table by the signal analyzer, based on the fourth test transmission signal, the fourth test receiving signal, and the fifth test receiving signal; and performing phase correction on the antenna unit to be tested according to the phase correction table by a transmitting/receiving circuit.

12. The method as claimed in claim 11, wherein the third test transmission signal, the fourth test transmission signal, and the fifth test transmission signal are digital modulation signals.

13. The method as claimed in claim 12, wherein the digital modulation signals are based on one of digital modulation schemes including quadrature phase-shift keying (QPSK), 8-phase-shift keying (8PSK), or Amplitude and phase-shift keying (APSK) modulation.

14. The method as claimed in claim 11, wherein the signal analyzer performs a gain analysis of the fourth test receiving signal and the fifth test receiving signal, based on computations of coordinates of in-phase (I) or quadrature (Q) axis with respect to the fourth test receiving signal and the fifth test receiving signal, and obtains corresponding I and Q coordinates, based on which a constellation diagram can be obtained correspondingly.

15. The method as claimed in claim 11, wherein the third test receiving signal sent from the reference antenna unit includes two sets of waveforms, the signal analyzer obtains a gain value based on a difference between peak values of the two sets of waveforms, and stores the gain value in the gain correction table.

16. The method as claimed in claim 11, wherein the DC offset generator generates the DC offset through a controller, and the DC offset signal is a known DC offset signal.

17. The method as claimed in claim 16, wherein the DC offset generator is a voltage-level phase shifter or bias tee.

18. The method as claimed in claim 11, wherein the phase correction table is generated by steps including:

analyzing, by the signal analyzer, the fourth test transmission signal, so as to obtain a first set of in-phase (I) and quadrature (Q) coordinates, and accordingly obtain a first constellation diagram with a phase angle of ϕ1;

analyzing, by the signal analyzer, the fourth test receiving signal and the fifth test receiving signal, so as to obtain a second set of I and Q coordinates and a third set of I and Q coordinates, respectively, and accordingly obtain a second constellation diagram with a phase angle of ϕ2 and a third constellation diagram with a phase angle of ϕ3 respectively;

obtaining a first relative offset amount of the fourth test receiving signal and the fifth test receiving signal due to the DC offset signal, based on a difference value between the phase angles of ϕ2 and ϕ3;

obtaining a second relative offset amount of the fourth test transmission signal and the fifth test receiving signal, based on a difference value between the phase angles of ϕ1 and ϕ3;

obtaining a phase offset amount of the fourth test transmission signal and the fourth test receiving signal, based on the second relative offset amount minus the first relative offset amount; and storing the phase offset amount in the phase correction table.

* * * * *